No. 814,555. PATENTED MAR. 6, 1906.
W. R. MECHERLE.
NUT LOCK.
APPLICATION FILED AUG. 23, 1905.
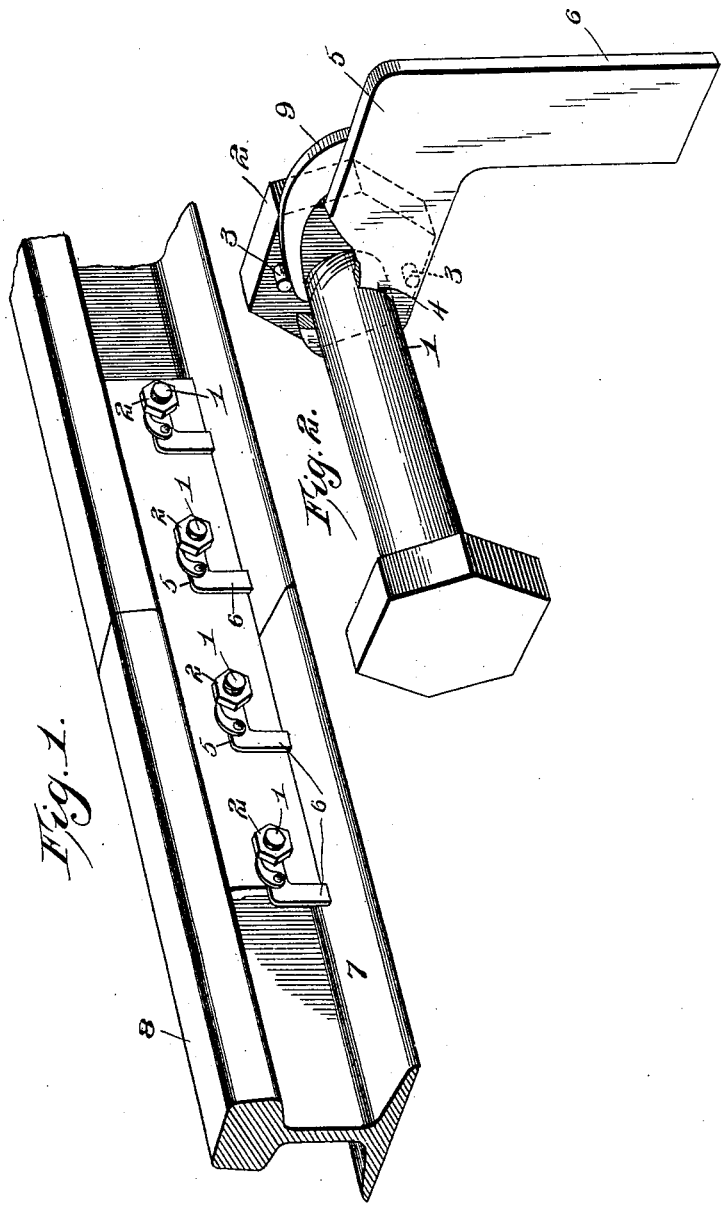
Witnesses
Louis R. Heinrich
Herbert D. Lawson
Inventor
Walter R. Mecherle
By W. J. FitzGerald
Attorneys

UNITED STATES PATENT OFFICE.

WALTER R. MECHERLE, OF BLOOMINGTON, ILLINOIS.

NUT-LOCK.

No. 814,555.

Specification of Letters Patent.

Patented March 6, 1906.

Application filed August 23, 1905. Serial No. 275,413.

*To all whom it may concern:*

Be it known that I, WALTER R. MECHERLE, a citizen of the United States, residing at Bloomington, in the county of McLean and State of Illinois, have invented certain new and useful Improvements in Nut-Locks; and I do hereby declare the following to be a full, clear, and exact description of the invention, such as will enable others skilled in the art to which it appertains to make and use the same.

My invention relates to nut-locks, and its object is to provide a device of simple construction which can be used upon ordinary forms of bolts and by means of which nuts can be securely locked, so as to prevent them from being accidentally removed.

The invention consists of a holding-plate of peculiar form adapted to engage the bolt and which rests on one of the base-flanges of a rail. This holding-plate has a dog pivoted to it, and the nut has a desired number of projections on it for engaging the dog should the nut be partly unscrewed for any purpose.

The invention also consists of certain other novel features of construction and combination of parts, which will be hereinafter more fully described in the claims.

In the accompanying drawings I have shown the preferred forms of my invention.

In said drawings, Figure 1 is a perspective view of a rail-joint having my improved nut-locks thereon. Fig. 2 is an enlarged detail view of the nut-lock.

Referring to the figures by numerals of reference, 1 is a bolt having a nut 2, from which extends a desired number of projections 3, said projections extending laterally from the inner face of the nut. The bolt extends through an aperture 4, formed in one end of an angular plate 5, the leg 6 of which is adapted to bear upon a fixed surface, such as the base-flange 7 of a rail 8. Pivotally connected to this angular plate is a dog 9, which is adapted to rest upon the bolt at a point between plate 5 and nut 2, and when the nut is screwed onto the bolt the projections 3 will successively contact with and slip under the dog. Should the movement of the nut be reversed, however, one of the projections will ride upon the dog and bind it on the bolt, and the unscrewing of the nut will therefore be prevented.

It will be seen that by the use of this form of lock nuts will be securely held in place, and the device is therefore particularly adapted for use on rail-joints, as illustrated in Fig. 1.

Having thus fully described my invention, what I claim as new, and desire to secure by Letters Patent, is—

1. The combination with a plate having an aperture therein; of a bolt within the aperture, a nut upon the bolt, a dog pivoted to the plate and normally seated by gravity upon the bolt between the nut and plate, and means upon the nut adapted to overlap and contact with the dog at a point between its ends.

2. The combination with a plate having an aperture therein; of a bolt within the aperture, a nut upon the bolt, a dog pivoted to the plate and normally seated by gravity upon the bolt between the nut and plate, and a lug extending from one face of the nut and overlapping the dog, said lug and dog adapted to contact at a point between the ends of the dog to bind the dog upon the bolt.

In testimony whereof I have signed my name to this specification in the presence of two subscribing witnesses.

WALTER R. MECHERLE

Witnesses:
HENRY S. DOOLEY,
W. F. YOUNG.